Jan. 15, 1963  C. HILL ETAL  3,073,405
VEHICLE BRAKING CONTROL
Filed May 25, 1960 2 Sheets-Sheet 2
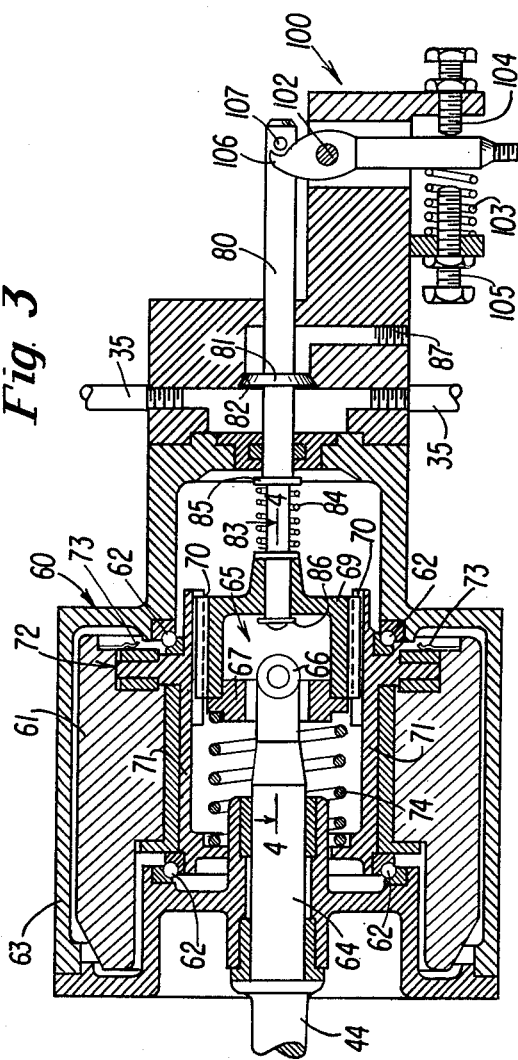
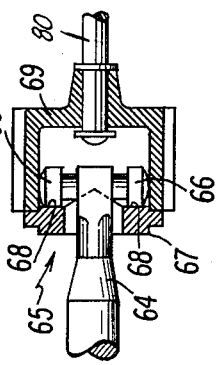
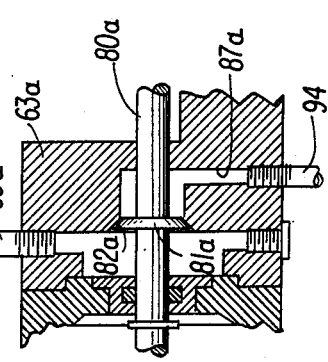
INVENTORS
Claude Hill
Anthony P. R. Rolt
BY Wolf, Hubbard, Voit & Osann
Attys.

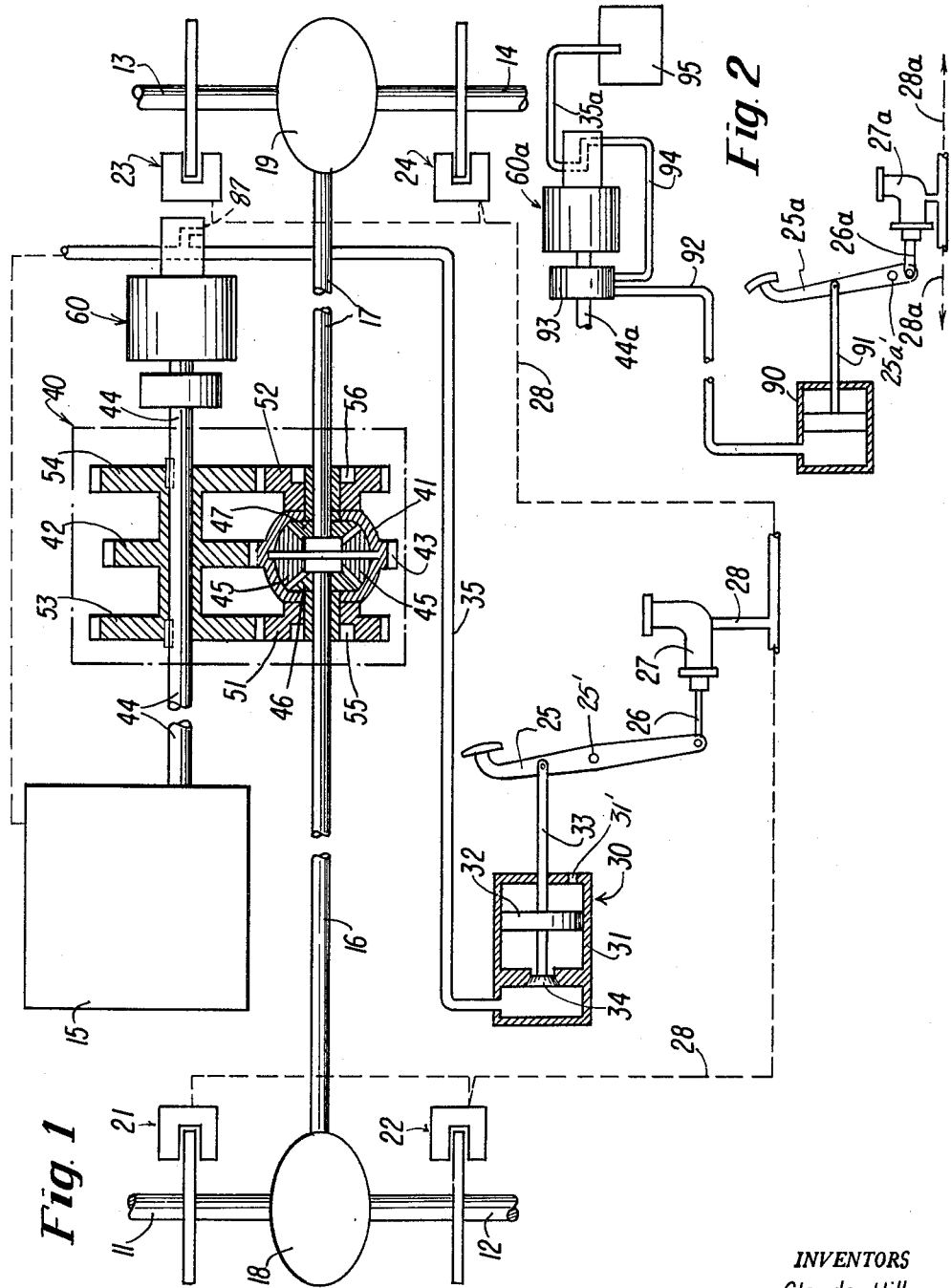

(abridged OCR below)

United States Patent Office

3,073,405
VEHICLE BRAKING CONTROL
Claude Hill, Kenilworth, and Anthony P. R. Rolt, Stratford-on-Avon, England, assignors to Harry Ferguson Research Limited, Abbotswood, England, a British company
Filed May 25, 1960, Ser. No. 31,735
13 Claims. (Cl. 180—44)

This invention relates to vehicle braking systems and concerns more particularly a braking control for preventing skidding and loss of braking force.

When the ground wheel brakes of a vehicle are applied with sufficient force to overcome the traction between the tires and the ground, the wheel tends to lock, that is become stationary relative to the vehicle. The tires thus skid on the ground and the vehicle operator experiences a loss of control over the vehicle. At the same time, the locking of the wheel means that the associated brake ceases to do any work and hence the effect of this brake toward reducing the speed of the vehicle is lost.

In a four-wheel drive vehicle, that is one having power supplied to a front pair of wheels and at least one pair of rear wheels, partial braking control is obtained by transmitting power to the front and rear pairs of wheels through an intermediate controlled differential gear. A controlled differential gear is one which has its differential action limited so that, in the environment being discussed, the rotational speeds of the front and rear drive shafts can vary from one another only between fixed upper and lower limits. When these limits are reached, the differential is locked and the drive shafts are forced to rotate at speeds which vary by the limits imposed. A drive of this type is disclosed and claimed in U.S. Patent No. 2,796,941, issued June 25, 1957.

The effect of such a device on the braking action of the vehicle wheels will be appreciated by those skilled in the art. Should either one, or both, of the rear wheels lock, the rear wheel drive shaft tends to slow down or stop. As soon as the rotational speed of the rear drive shaft relative to the speed of the front drive shaft exceeds the lower limit imposed by the controlled differential gear, further differential action is prevented forcing the locked rear wheel or wheels to rotate at the predetermined speed differential relative to the front drive shaft. Of course the same effect occurs if one, or both, of the front wheels tend to lock.

However, should one front and one rear wheel lock, or all four wheels lock, the controlled differential gear and the arrangement described above does not come into play since both front and rear drive shafts then decelerate at about the same rate.

To prevent locking during braking of an individual wheel, it has been proposed to employ inertia type, anti-skid units associated with each vehicle wheel. These devices, broadly speaking, operate by releasing the braking force if the wheel decelerates more rapidly than a predetermined maximum. Upon a tendency of the wheel to lock, the wheel sharply decelerates beyond the predetermined maximum limit with the result that the braking force is relaxed.

One difficulty experienced in using such devices in automotive vehicles has been their inability to compensate for the widely varying ground conditions encountered. With good tires and dry pavement, hard braking and rapid deceleration is possible and desirable. On wet, slippery pavement or loose gravel, even light braking and relatively moderate deceleration tends to cause wheel locking. Thus, an anti-skid unit of this type which is designed to prevent skidding on dry pavement is not effective when the road is slippery, and, conversely, a unit designed to prevent skidding under slippery conditions unnecessarily limits braking action when a pavement is dry.

Keeping in mind the above, it is the primary aim of the invention to provide a novel braking control for preventing excessive braking force from locking any one, or any combination, of the wheels of a vehicle so as to avoid skidding and a loss of braking force. More specifically, it is and object of the invention to provide a novel braking control especially well suited for four-wheel drive vehicles and which combines a controlled differential gear with a single inertia type, anti-skid unit.

Another object of the invention is to provide a novel control as characterized above which prevents wheel locking under adverse road conditions as prevented by loose gravel or wet slippery pavement but which permits high braking forces to be employed when road conditions permit.

A further object is to provide a braking control as described above which can be utilized with either manually powered or power assisted braking systems.

It is also an object to provide a braking control of the above type which is a single compact unit although able to control the braking at each drive wheel of a four-wheel drive vehicle. A collateral object is to provide such a compact unit which requires no additional gearing, does not add to the unsprung mass of the vehicle and is readily protected from dirt and vibration.

Yet another object is to provide a braking control having the above characteristics which is inexpensive to manufacture and reliable in operation so as to be practical for high volume, commercial manufacture and use.

Other objects and advantages of the invention will become apparent upon reading the following detailed description and upon reference to the drawings in which:

FIGURE 1 is a diagrammatic representation of a drive and braking system for a vehicle which embodies the invention;

FIG. 2 is a fragmentary diagrammatic view similar to FIG. 1 showing an alternate modification;

FIG. 3 is an enlarged section of a portion of the system shown in FIG. 1;

FIG. 4 is a fragmentary section taken approximately along a line 4—4 of FIG. 3; and FIG. 5 is an enlarged fragmentary section showing a portion of a system illustrated in FIG. 2.

While the invention will be described in connection with certain preferred embodiments, it will be understood that we do not intend to limit the invention to those embodiments. On the contrary, we intend to cover all alternatives, modifications and equivalents as may be included within the spirit and scope of the invention as defined by the appended claims.

Turning first to FIG. 1, there is shown a vehicle drive and braking system which embodies the present invention. The drive includes a pair of front axles 11 and 12 and a pair of rear axles 13 and 14 each of which is rotatably coupled in the usual manner to ground engaging vehicle wheels, not shown. A power plant in the form of an internal combustion engine 15 is coupled through front drive shaft 16 and rear drive shaft 17 to each of the axles 11–14 so as to provide a four-wheel drive system. As is conventional, the front drive shaft 16 is connected to the front axles 11, 12 through a differential gear 18 and the rear drive shaft 17 is coupled to the rear axles 13, 14 through a differential gear 19.

Each ground engaging wheel is individually braked and in the illustrated construction this is accomplished by providing each of the axles 11–14 with brakes 21, 22, 23 and 24 respectively. For actuating the individual wheel brakes 21–24, a power assisted system is provided including a brake pedal lever 25 pivoted at 25' and coupled by a rod 26 to a master cylinder 27. Hydraulic lines 28 extend from the master cylinder 27 to each of the brakes 21–24 so that movement of the brake pedal lever 25 in a counterclockwise direction as seen in FIG. 1 causes actuation of each of the brakes.

To provide a power assist for the brake actuating system, a pneumatic motor 30 including a cylinder 31 and a piston 32 is provided with the piston being coupled by a rod 33 to the brake pedal lever 25. The rod 33 also carries a valve element 34 which, when unseated, opens the cylinder 31 through a line 35 to the manifold of the engine 15. Thus, when the brake pedal lever 25 is manually moved in a counterclockwise direction, the first increment of movement urges the rod 33 to the left in FIG. 1 so as to unseat the valve element 34. A negative pressure is thus created at the left of the piston 32 within the cylinder 31 so that atmospheric pressure, acting through a port 31′, urges the piston to the left, thereby developing a force tending to assist the movement of the brake pedal lever 25 to apply the brakes 21–24.

Alternatively, a non-power assisted brake actuating system of the type shown in FIG. 2 can be employed. In this embodiment parts corresponding to those previously described have been given the same reference numeral with the distinguishing suffix a added. The manual braking system utilizes a brake pedal lever 25a that is pivoted at 25a′ and coupled through a link 26a to a master cylinder 27a. Lines 28a lead from the master cylinder to the individual brakes of the vehicle. Since no power assisting motor is provided to assist in actuating the brakes, the brake pedal lever 25 is pivoted so as to afford a high mechanical advantage and manual pressure alone on the lever 25 is sufficient to effectively actuate the vehicle brakes.

In carrying out the invention, the engine 15 drives the front and rear drive shafts 16, 17 through a controlled differential gear 40 whose differential action is mechanically limited. In the illustrated embodiment, the input element of the differential gear 40, a carrier 41, is coupled through gears 42 and 43 to an engine shaft 44 powered by the engine 15. The carrier 41 supports planet gears 45 which are in meshing engagement with sun gears 46 and 47 that constitute the output elements of the differential gear 40. The sun gears 46, 47 are keyed respectively to the front and rear drive shafts 16, 17.

For controlling the differential action of the gear 40, a pair of overrunning gears 51 and 52 are journalled on the drive shafts 16, 17 respectively and are driven by gears 53 and 54 secured to the engine shaft 44. One-way overrunning clutches 55, 56 are interposed between the gears 51, 52 and their respective drive shafts so that the gears 51, 52 can rotate more rapidly, but not more slowly, than the drive shafts 16, 17 on which they are journalled. The drive ratios of the gear pairs 42 and 43, 51 and 53 and 52 and 54 are selected so that the gears 51, 52 are driven at higher rotational speeds than the differential carrier 41 under normal conditions when the differential gear is not "working" and the drive shafts 16, 17 are being driven at the same rotational speed. Hence, under normal conditions, the gears 51, 52 overrun their respective drive shafts 16, 17.

Should one of the drive shafts slow down relative to the engine shaft 44, the speed of the other drive shaft will be increased due to the action of the differential gear 40. Assuming that the speed of the engine shaft 44 remains constant, the carrier 41 and the overrunning gears 51 and 52 continue to rotate at their same relative speeds.

Thus, if the drive shaft 17 is slowed down, the overrunning gear 52 on that shaft continues to overrun but the other drive shaft 16 can only increase its rotational speed to the speed of the overrunning gear 51 carried on that shaft. At that point, the one-way clutch 55 locks the shaft 16 and the gear 51 together and further differential action in the gear 40 is prevented. When the clutch 55 locks the gear 51 to the drive shaft 16, these parts rotate at the same speed and since the differential gear carrier 41 continues to rotate at a constant speed relative to the gear 51, the drive shaft 17 is forced to rotate. In this way, the rotational speeds of the two drive shafts 16 and 17 cannot vary beyond the limits imposed by the overrunning gears 51, 52. It will be understood that the action is the same should the drive shaft 16 begin to slow down relative to the rotational speed of the drive shaft 17.

In accordance with the invention, an inertia type, antiskid unit 60 is rotatably coupled to the input element of the differential gear 40, which is the carrier 41, and is arranged for at least partially disabling the brake actuating system upon a deceleration of the carrier 41 that is greater than a predetermined amount. In the illustrated embodiment, the unit 60 includes a flywheel 61 journalled on bearings 62 in a housing 63. The flywheel 61 is journalled coaxially with the engine shaft 44 (see FIG. 1), and provided with an extension 64 that is journalled in the housing 63 and is rotatably coupled to the flywheel 61 through a resilient coupling 65.

Preferably, the resilient coupling 65 includes cam followers in the form of rollers 66 (see also FIG. 4) journalled on the end of the engine shaft extension 64 and which ride on an annular cam 67 having depressions 68. In this embodiment, the cam 67 is the movable element of the cam and follower construction and thus the cam 67 is secured to an annular member 69 which is slidably keyed at 70 within a sleeve 71. The sleeve 71 rotatably carries the flywheel 61 and is coupled thereto by a plurality of annular friction disks 72 which are urged into frictional clutching engagement by springs 73. A compressed helical spring 74 fitted within the sleeve 71 urges the cam 67 and its supporting member 69 toward the right in FIG. 3 and thus resiliently holds the cam follower 66 in the depressions 68 formed in the cam.

It can now be understood that so long as the cam followers 66 remain seated in the depressions 68 of the cam 67, a rotatable coupling is maintained between the engine shaft 44 and the flywheel 61. However, should the engine shaft 44 decelerate rapidly the inertial force built up in the rapidly rotating flywheel 61 tends to cause the flywheel to overrun the engine shaft. When this overrunning tendency overcomes the force exerted by the spring 74, it will be seen that the cam followers 66 ride out of the cam depressions 68 and thus urge the cam 67 and the annular member 69 toward the left in FIG. 3.

For at least partially disabling the actuating system under the control of the anti-skid unit 60, a control member 80 is connected to the resilient coupling 65 so as to be moved upon a predetermined amount of deflection in the coupling. In the preferred construction, the control member 80 is slidably mounted in the housing 63 and carries a valve element 81 which fits in a valve seat 82. The control member 80 is also slidably received at 83 in the cam carrying member 69 and a light spring 84 is compressed between the member 69 and a collar 85 carried by the control member. The spring 84 urges the control member toward the right in FIG. 3 and resiliently holds the valve element 81 in the valve seat 82.

To move the control member 80 upon deflection of the resilient coupling 65, a stop 86 is secured to the end of the control member so that it will be engaged by the cam carrying member 69. Thus, when the cam followers 66 ride out of the cam depressions 68 and urge the cam and its carrier member 69 toward the left in FIG. 3, the member 69 engages the control member stop 86 and moves the control member so as to unseat the valve element 81. In this way a predetermined amount of deflection in the resilient coupling between the engine shaft 44 and the flywheel 61 causes movement of the control member 80.

In the FIG. 1 braking control system, movement of the control member 80 unseats the valve element 81 so as to vent the line 35 which connects the pneumatic motor 30 to the manifold of the engine 15. This is accomplished by utilizing the valve element 81 to block a passage 87 leading directly from the line 35 and opening to the atmosphere. Thus, unseating of the valve element 81 interrupts the power assist of the pneumatic motor 30 so that only the manual force exerted through the brake pedal lever 25 is effective to actuate the brakes 21–24. In this way, movement of the control member 80 by the anti-skid unit 60 partially disables the brake actuating system.

In the braking system shown in FIG. 2, an anti-skid unit 60a including a housing 63a is resiliently coupled to an engine drive shaft 44a to move a control member 80a upon a predetermined amount of deflection in the resilient coupling (see also FIG. 5). The control member 80a carries a valve element 81a which cooperates with a valve seat 82a.

For at least partially disabling the brake actuating system shown in FIG. 2 under the control of the unit 60a, a hydraulic motor 90 is coupled by a link 91 to the brake pedal lever 25a. The motor 90 is connected through a line 92 to a hydraulic pump 93 driven by the engine shaft 44a and the pump 93 receives hydraulic fluid through lines 94 and 35a from a reservoir 95.

As can be seen in FIG. 5, the line 94 is connected to a passage 87a in the housing 63a so that the valve element 81a, when fitted into its seat 82a, blocks the transmission of hydraulic fluid from the reservoir 95 to the pump 93. However, upon movement of the control member 80a so as to unseat the valve element 81a, the lines 94 and 35a are opened to permit the pump 93 to draw hydraulic fluid from the reservoir and supply it to the motor 90 with the result that a hydraulic pressure is exerted on the brake pedal lever 25a tending to resist manual movement of the lever. This resistance, in effect, nullifies the high mechanical advantage of the brake pedal lever 25a and thus partially disables the brake actuating system.

It can now be understood that the intermediate controlled differential gear 40 together with the unit 60 is effective to prevent overbraking and locking up at any one, or any combination, of the vehicle ground wheels. If one or both of the front brakes 21, 22 tend to lock, the differential gear 40 forces rotation of the front drive shaft 16 and thus of the front axles 11, 12 by refusing to permit the drive shaft 16 to rotate at less than the predetermined speed limit imposed by the overrunning gear 51. Conversely, the same is true if one or both of the rear brakes 23, 24 tend to lock.

If one front brake and one rear brake, or if all four brakes, tend to lock, the sudden deceleration of the engine shaft 44 is too rapid to permit slowing down the high-inertia flywheel 61 without deflecting the resilient coupling 65. As a result, the cam followers 66 ride out of the cam depressions 68, moving the control member 80, and the brake actuating system is partially disabled so as to obviate the wheel locking tendency. Thus, locking and skidding of any wheel, or any combination of wheels, and the resulting loss in braking force, is prevented.

Further in accordance with the invention, the anti-skid unit 60 is associated with a regulator 100 which permits high braking forces to be employed when road conditions permit while allowing the unit 60 to prevent wheel locking and skidding on loose material or wet slippery pavement. The regulator 100 includes a mass which is coupled to the control member 80 so that the force of inertia tending to move the mass as the vehicle decelerates resists movement of the control member. In the preferred embodiment, the mass is a pendulum 101 pivoted at 102 on an axis extending transversely of the vehicle. A light spring 103 urges the pendulum against an adjustable stop 104 so as to establish a normal position for the pendulum. When the vehicle decelerates, the pendulum 101 swings forward, that is to the left in FIG. 3, under the impetus of inertia and, of course, the more rapid the vehicle deceleration, the greater the inertial force exerted on the pendulum in a forward direction. Preferably, an adjustable stop 105 limits forward swinging movement of the pendulum.

To couple the pendulum 101 and the control member 80, the pendulum is provided with a finger 106 which cooperates with a pin 107 carried by the control member. The finger 106 and pin 107 are slightly spaced when the pendulum 101 is in its normal position against the stop 104 so that the control member 80 can move sufficiently far to unseat the valve element 81 without the pin 107 coming into contact with the finger 106. However, during rapid deceleration of the vehicle, the pendulum 101 swings in a clockwise direction as seen in FIG. 3 so as to bring the finger 106 against the pin 107. In this way, the force of inertia tending to swing the pendulum 101 resists movement of the control member 80 and, in effect, adds an inertial force to the force of the helical spring 74 which must be overcome to cause deflection of the resilient coupling 65. It will be apparent that the greater the deceleration rate of the vehicle, the greater the inertial force exerted by the pendulum 101 on the control member.

It will thus be understood that applying vehicle brakes 21–24 when the traction conditions between the ground wheels and the road are excellent, the vehicle will at once begin rapid deceleration. This causes the pendulum 101 to be swung forward so that its inertial force tends to hold the control member 80 in its normal position. The high braking force can thus be maintained even though it results in a rapid deceleration of the engine shaft 44 since the deflection of the resilient coupling 65 is then resisted both by the spring 74 and the pendulum 101.

On the other hand, if the vehicle brakes are applied heavily when the ground wheels are riding on loose gravel or slippery pavement, any tendency of the wheels to lock and skid on the slippery surface would not decelerate the vehicle so as to swing the pendulum 101 although the engine shaft 44 decelerates. Under these conditions, the regulator 100 adds no force tending to hold the control member 80 in its normal position and hence a too rapid deceleration of the engine shaft 44 is quickly accompanied by a deflection in the resilient coupling 65. This results in movement of the control member to unseat the valve element 81 which, of course, partially disables the brake actuating system and relieves the tendency of the vehicle wheels to lock and skid.

Those skilled in the art will appreciate that the combination of the controlled differential gear 40 and the anti-skid unit 60 provides a convenient, single, compact unit which is effective to control the braking at each driven wheel of the vehicle. Furthermore, these mechanisms can be conveniently mounted adjacent the vehicle transmission without requiring additional gearing or adding to the unsprung mass of the vehicle. Such location also enables the combination of the gear 40 and unit 60 to be easily protected from dirt and vibration.

We claim as our invention:

1. In a vehicle having a power plant and two ground wheel drive shafts coupled to different ground wheels with individual brakes, a brake control system comprising, in combination, an engine shaft rotatably coupled to said power plant, a controlled differential gear having its input element rotatably coupled to said engine shaft, said gear having its output elements rotatably coupled to respective ones of said drive shafts, means associated with said differential gear for limiting the differential action and thus preventing the drive shafts from rotating at speeds which vary more than a predetermined amount, a flywheel resiliently coupled to said engine shaft, a control member connected to said resilient coupling so as to be moved upon a predetermined amount of deflection in said coupling, means for actuating the individual brakes of said ground wheels, and means coupled to said control member for at least partially disabling said brake actuating means upon movement of said control member.

2. In a vehicle having a power plant and two ground wheel drive shafts coupled to different ground wheels with individual brakes, a brake control system comprising, in combination, an engine shaft rotatably coupled to said power plant, a controlled differential gear having its input element rotatably coupled to said engine shaft, said gear having its output elements rotatably coupled to respective ones of said drive shafts, means associated with said differential gear for limiting the differential action and thus preventing the drive shafts from rotating at speeds which vary more than a predetermined amount, a flywheel coupled to said engine shaft through a cam follower and a cam having a depression, resilient means for urging said cam follower into said depression and thus maintaining a rotatable coupling between said flywheel and said ground wheels, a control member associated with said cam and cam follower so as to be moved when the cam follower is urged out of said depression against the urging of said resilient means, means for actuating the individual brakes of said ground wheels, and means coupled to said control member for at least partially disabling said brake actuating means upon movement of said control member.

3. In a vehicle having a power plant and two ground wheel drive shafts coupled to different ground wheels with individual brakes, a brake control system comprising, in combination, an engine shaft rotatably coupled to said power plant, a controlled differential gear having its input element rotatably coupled to said engine shaft, said gear having its output elements rotatably coupled to respective ones of said drive shafts, means associated with said differential gear for limiting the differential action and thus preventing the drive shafts from rotating at speeds which vary more than a predetermined amount, a flywheel resiliently coupled to said engine shaft, a control member connected to said resilient coupling so as to be moved upon a predetermined amount of deflection in said coupling, means on said vehicle for actuating the individual brakes of said ground wheels, means coupled to said control member for at least partially disabling said brake actuating means upon movement of said control member, a pendulum swingingly mounted on said vehicle, means urging said pendulum to a normal position, said pendulum being swingable from said normal position under the impetus of inertia on deceleration of said vehicle, and a lost-motion connection between said pendulum and said control member permitting movement of the member at least to partially disable said brake actuating means when said pendulum occupies said normal position, said lost-motion connection transferring the force of inertia exerted on said pendulum to said control member when the pendulum is swung from its normal position.

4. In a vehicle having a power plant and two ground wheel drive shafts coupled to different ground wheels with individual brakes, a brake control system comprising, in combination, an engine shaft rotatably coupled to said power plant, a controlled differential gear having its input element rotatably coupled to said engine shaft, said gear having its output elements rotatably coupled to respective ones of said drive shafts, means associated with said differential gear for limiting the differential action and thus preventing the drive shafts from rotating at speeds which vary more than a predetermined amount, a flywheel resiliently coupled to said engine shaft, a control member connected to said resilient coupling so as to be moved upon a predetermined amount of deflection in said coupling, means including a power assisting pneumatic motor having a cylinder for actuating the individual brakes of said ground wheels, and means coupled to said control member and said cylinder for venting said cylinder and thus partially disabling said brake actuating means upon movement of said control member.

5. In a vehicle having a power plant and two ground wheel drive shafts coupled to different ground wheels with individual brakes, a brake control system comprising, in combination, an engine shaft rotatably coupled to said power plant, a controlled differential gear having its input element rotatably coupled to said engine shaft, said gear having its output elements rotatably coupled to respective ones of said drive shafts, means associated with said differential gear for limiting the differential action and thus preventing the drive shafts from rotating at speeds which vary more than a predetermined amount, a flywheel resiliently coupled to said engine shaft, a control member connected to said resilient coupling so as to be moved upon a predetermined amount of deflection in said coupling, means including a lever for actuating the individual brakes of said ground wheels, a fluid motor coupled to said lever, a source of fluid under pressure, and means coupled to said control member and said fluid source for causing fluid to flow from said source to said motor so as to resist movement of said member and thus partially disable said brake actuating means upon movement of said control member.

6. In a vehicle having a ground wheel with a brake, a braking control system comprising, in combination, a flywheel rotatably coupled to said ground wheel through a resilient coupling, a control member connected to said resilient coupling so as to be moved upon a predetermined amount of deflection in said coupling, means for actuating said brake, means coupled to said control member for at least partially disabling said brake actuating means upon movement of said control member, means defining a mass carried by the vehicle, and means coupling said mass and said control member so that the force of inertia tending to move the mass as the vehicle is decelerated resists movement of said control member.

7. In a vehicle having a ground wheel with a brake, a braking control system comprising, in combination, a flywheel rotatably coupled to said ground wheel through a cam follower and a cam having a depression, resilient means for urging said cam follower into said depression and thus maintaining a rotatable coupling between said flywheel and said ground wheel, a control member associated with said cam and cam follower so as to be moved when the cam follower is urged out of said depression against the urging of said resilient means, means for actuating said brake, means coupled to said control member for at least partially disabling said brake actuating means upon movement of said control member, means defining a mass carried by the vehicle, and means coupling said mass and said control member so that the force of inertia tending to move the mass as the vehicle is decelerated resists movement of said control member.

8. In a vehicle having a ground wheel with a brake, a braking control system comprising, in combination, a flywheel rotatably coupled to said ground wheel through a resilient coupling, a control member connected to said resilient coupling so as to be moved upon a predetermined amount of deflection in said coupling, means for actuating said brake, means coupled to said control member for at least partially disabling said brake actuating means upon movement of said control member, a pendulum swingingly mounted on said vehicle, means urging said pendulum to a normal position, said pendulum being swingable from said normal position under the impetus of inertia on deceleration of said vehicle, a connection between said pendulum and said control member for transferring the force of inertia exerted on said pendulum to said control member when the pendulum is swung from its normal position.

9. In a vehicle having a power plant and two ground wheel drive shafts coupled to different ground wheels with individual brakes, a braking control system comprising, in combination, a differential gear affording limited differential action and having its input element rotatably coupled to said power plant, said gear having its output elements rotatably coupled to respective ones of said drive shafts, means for actuating the individual brakes of said ground wheels, a flywheel rotatably connected to said input element, and means including said rotatable connection for at least partially disabling said brake actuating means upon a deceleration of said input element relative to said flywheel that is greater than a predetermined amount.

10. In a vehicle having a power plant and two ground wheel drive shafts coupled to different ground wheels with individual brakes, a braking control system comprising, in combination, a differential gear affording limited differential action and having its input element rotatably coupled to said power plant, said gear having its output elements rotatably coupled to respective ones of said drive shafts, means for actuating the individual brakes of said ground wheels, a flywheel rotatably connected to said input element through a cam follower and a cam having a depression, resilient means for urging said cam follower into said depression and thus maintaining a rotatable coupling between said flywheel and said input element, and means including said rotatable coupling for at least partially disabling said brake actuating means upon a deceleration of said input element relative to said flywheel that overcomes said resilient means.

11. In a vehicle having a power plant and two ground wheel drive shafts coupled to different ground wheels with individual brakes, a braking control system comprising, in combination, a differential gear affording limited differential action and having its input element rotatably coupled to said power plant, said gear having its output elements rotatably coupled to respective ones of said drive shafts, means for actuating the individual brakes of said ground wheels, a flywheel rotatably connected to said input element, a control member, means including said rotatable connection for moving said control member and at least partially disabling said brake actuating means upon a deceleration of said input element relative to said flywheel that is greater than a predetermined amount, a pendulum swingingly mounted on said vehicle, means urging said pendulum to a normal position, said pendulum being swingable from said normal position under the impetus of inertia on deceleration of said vehicle, and a lost-motion connection between said pendulum and said control member permitting movement of the member to at least partially disable said brake actuating means when said pendulum occupies said normal position, said lost-motion connection transferring the force of inertia exerted on said pendulum to said control member when the pendulum is swung from its normal position.

12. In a vehicle having a power plant and two ground wheel drive shafts coupled to different ground wheels with individual brakes, a braking control system comprising, in combination, a differential gear affording limited differential action and having its input element rotatably coupled to said power plant, said gear having its output elements rotatably coupled to respective ones of said drive shafts, means including a power assisting pneumatic motor having a cylinder for actuating the individual brakes of said ground wheels, a flywheel rotatably connected to said input element, and means including said rotatable connection between said flywheel and said input element for venting said cylinder and thus partially disabling said brake actuating means upon a deceleration of said input element relative to said flywheel that is greater than a predetermined amount.

13. In a vehicle having a power plant and two ground wheel drive shafts coupled to different ground wheels with individual brakes, a braking control system comprising, in combination, a differential gear affording limited differential action and having its input element rotatably coupled to said power plant, said gear having its output elements rotatably coupled to respective ones of said drive shafts, means including a lever for actuating the individual brakes of said ground wheels, a fluid motor coupled to said lever, a source of fluid under pressure, a flywheel rotatably connected to said input element, and means including said rotatable connection for transmitting fluid from said source to said motor so as to resist movement of said lever and thus partially disable said brake actuating means upon a deceleration of said input element relative to said flywheel that is greater than a predetermined amount.

References Cited in the file of this patent
UNITED STATES PATENTS

| | | |
|---|---|---|
| 2,012,737 | Baughman | Aug. 27, 1935 |
| 2,270,586 | Jahaut et al. | Jan. 20, 1942 |
| 2,796,941 | Hill | June 25, 1957 |
| 2,851,115 | Buckendale | Sept. 9, 1958 |
| 2,906,561 | Holton | Sept. 29, 1959 |
| 2,949,740 | Aikman | Aug. 23, 1960 |